US009255011B2

(12) United States Patent
Kawata et al.

(10) Patent No.: US 9,255,011 B2
(45) Date of Patent: Feb. 9, 2016

(54) METHOD FOR PRODUCING LITHIUM CARBONATE

(71) Applicants: Masanobu Kawata, Tokyo (JP); Hirohumi Tanaka, Tokyo (JP); Kohei Mitsuhashi, Tokyo (JP); Ryo Kawarabuki, Tokyo (JP); Youichi Yamamoto, Chiba (JP); Keita Kamiyama, Chiba (JP); Atsushi Moriya, Chiba (JP); Norifumi Sakai, Chiba (JP)

(72) Inventors: Masanobu Kawata, Tokyo (JP); Hirohumi Tanaka, Tokyo (JP); Kohei Mitsuhashi, Tokyo (JP); Ryo Kawarabuki, Tokyo (JP); Youichi Yamamoto, Chiba (JP); Keita Kamiyama, Chiba (JP); Atsushi Moriya, Chiba (JP); Norifumi Sakai, Chiba (JP)

(73) Assignees: NITTETSU MINING CO., LTD., Tokyo (JP); TOYO ENGINEERING CORPORATION, Chiba (JP); SUMITOMO CORPORATION, Tokyo (JP)

( * ) Notice: Subject to any disclaimer, the term of this patent is extended or adjusted under 35 U.S.C. 154(b) by 341 days.

(21) Appl. No.: 13/688,350

(22) Filed: Nov. 29, 2012

(65) Prior Publication Data
US 2013/0251610 A1 Sep. 26, 2013

(30) Foreign Application Priority Data
Mar. 22, 2012 (JP) ................................ 2012-064773

(51) Int. Cl.
*C01D 15/08* (2006.01)

(52) U.S. Cl.
CPC ...................................... *C01D 15/08* (2013.01)

(58) Field of Classification Search
CPC .......................................................... C01D 15/08
USPC ............................................... 423/179.5, 428
See application file for complete search history.

(56) References Cited

U.S. PATENT DOCUMENTS

| 4,261,960 A | * | 4/1981 | Boryta | 423/179.5 |
| 4,636,295 A | * | 1/1987 | Ball et al. | 204/529 |
| 5,993,759 A | * | 11/1999 | Wilkomirsky | 423/179.5 |
| 6,207,126 B1 | | 3/2001 | Boryta et al. | |
| 2004/0074774 A1 | | 4/2004 | Chang et al. | |

(Continued)

FOREIGN PATENT DOCUMENTS

| CL | 2938-98 | 9/1999 |
| CL | 1606-99 | 3/2004 |

(Continued)

OTHER PUBLICATIONS

Fuchiwaki et al, "Research of Lithium Recovery Technology from South American Salt Lake Brine", Magazine of the Society of Sea Water Science, Feb. 1, 2012, pp. 8 to 11, vol. 66, No. 1, Japan.

(Continued)

*Primary Examiner* — Daniel C McCracken
(74) *Attorney, Agent, or Firm* — Sughrue Mion, PLLC

(57) ABSTRACT

The present invention relates to a method for producing lithium carbonate, which is important as a raw material of a lithium ion battery and the like, from brine resources. More specifically, the invention relates to a method for producing lithium carbonate, in which carbon dioxide gas obtained by calcining limestone is introduced, in the presence of ammonia, into a concentrated brine, which is prepared from a lithium-containing brine as a raw material through an evaporative concentrating step, a desulfurizing step and an electrodialysis step, thereby depositing lithium carbonate crystals, and the crystals thus deposited are recovered through solid-liquid separation.

8 Claims, 3 Drawing Sheets

(56) References Cited

U.S. PATENT DOCUMENTS

| | | |
|---|---|---|
| 2006/0115407 A1 | 6/2006 | Boryta et al. |
| 2011/0200508 A1* | 8/2011 | Harrison et al. .............. 423/276 |
| 2012/0237419 A1 | 9/2012 | Tanimura et al. |

FOREIGN PATENT DOCUMENTS

| | | |
|---|---|---|
| CL | 1347-10 | 3/2011 |
| CL | 60-12 | 9/2012 |
| CL | 2968-12 | 1/2013 |
| CN | 1542147 A | 11/2004 |
| CN | 101234767 A | 8/2008 |
| CN | 101508450 A | 8/2009 |
| CN | 101905897 A | 12/2010 |
| JP | 55144410 A | 11/1980 |
| JP | 59039719 A | 3/1984 |
| JP | 62036013 A | 2/1987 |
| JP | 09100118 A | 4/1997 |
| JP | 2004142986 A | 5/2004 |
| JP | 2009046390 A | 3/2009 |
| JP | 2010265142 A | 11/2010 |
| JP | 2012116681 A | 6/2012 |
| WO | 2010/006366 A1 | 1/2010 |

OTHER PUBLICATIONS

Office Acton issued Aug. 6, 2013, by the Japan Patent Office in corresponding Japanese Application No. 2012-064773.

GSJ Chishitsu News, "Lithium Resources", Jun. 2010, No. 670, pp. 22-26.

GSJ Chishitsu News, "Production of Lithium from Salar de Atacama, Chile, and Use of Lithium Compounds", No. 670, pp. 49-52, Jun. 2010.

Office Action dated Oct. 13, 2014, issued by the Chilean Patent Office in counterpart Chilean Application No. 3342-12.

Second Office Action dated Apr. 27, 2015, issued by the Intellectual Property Office of Chile in counterpart Chilean Application No. 3342-12.

Chinese Office Action issued in corresponding Chinese Patent Application No. 201210505072.2 issued Oct. 9, 2015 With English translation.

* cited by examiner

METHOD FOR PRODUCING LITHIUM CARBONATE

FIELD OF THE INVENTION

The present invention relates to a method for producing lithium carbonate, which is important as a raw material of a lithium ion battery and the like, from brine resources.

More specifically, the invention relates to a method for producing lithium carbonate, in which carbon dioxide gas obtained by calcining limestone is introduced, in the presence of ammonia, into a concentrated brine, which is prepared from a lithium-containing brine as a raw material through an evaporative concentrating step, a desulfurizing step and an electrodialysis step, thereby depositing lithium carbonate crystals, and the crystals thus deposited are recovered through solid-liquid separation.

BACKGROUND OF THE INVENTION

Lithium carbonate is widely used as an additive for heat resistant glass, optical glass and the like, a ceramic material, a material for a semiconductor laser, lubricating grease, a material for a lithium ion battery, and the like.

In recent years, particularly, a lithium ion battery finds increasing applications for compact batteries for a mobile telephone and a notebook computer, and also is promised as a battery for an electric vehicle. Accordingly, strategic resource management of lithium is becoming important for addressing the future increase of the number of electric vehicles.

The major resources of lithium include lithium ores and lithium-containing brines.

Known lithium ores include spodumene ($LiAlSi_2O_6$), petalite ($LiAlSi_4O_{10}$) and lepidolite ($K(Li,Al)_3Si_4O_{10}(OH,F)_2$), which are yielded in pegmatite deposits or the like. In the case of ore type resource, the concentrated ores may have a content of approximately from 3 to 6% by mass in terms of $Li_2O$.

On the other hand, in the case of brine type resource, salt lake brines are the most important. In the orogenic zones, for example, the Andes, water soluble components including sodium chloride, which are eluted from the surrounding marine rocks, flow with stream water into the mountain top lakes formed through rapid uplift, and concentrated over a long period of time, and thus salts are deposited and accumulated to form salt lakes.

The salt lakes accumulate inside saturated brines, which are referred to as salt lake brines. The salt lake brine contains sodium chloride derived from marine water as a major component, and also contains cationic components, such as potassium, lithium, magnesium and calcium, and anionic components, such as chlorine, bromine, sulfuric acid and boric acid. The composition varies depending on the mineral species and the volcanic activity around the salt lakes, in addition to the influence of the marine water components.

Among the salt lake brines, one that has a high lithium concentration becomes a target of development as a lithium resource. As for the salt lakes that are currently operated for lithium recovery, there are reports that the salt lake brine of Atacama Salt Lake, Chile, has a lithium concentration of 2 g/L, the salt lake brine of Hombre Muerto Salt Lake, Argentina, has a lithium concentration of 0.5 g/L, and the salt lake brine of Silver Lake, the U.S.A., has a lithium concentration of 0.3 g/L (see, for example, Non-patent Document 1).

The method for recovering lithium from the brines mainly includes a concentrating step by solar evaporation, an impurity removing step by addition of chemicals, and a carbonation step by addition of sodium carbonate.

In the evaporation concentrating step, lithium is concentrated from the aforementioned lithium concentration to a high concentration that is required for the carbonation step. For the salt lake brine of Atacama Salt Lake, Chile, the lithium concentration is increased through solar evaporation concentration to approximately 60 g/L over a period exceeding one year.

A brine mainly containing chlorides has a high solubility for lithium chloride, and the lithium concentration can be increased to a high concentration around 60 g/L. In the case where a brine contains a large amount of sulfate ion, however, lithium sulfate ($Li_2SO_4.H_2O$) is deposited in the process of evaporation concentration. Thus, the lithium concentration can be increased up to only approximately 6 g/L, and lithium is lost as lithium sulfate.

Furthermore, while a salt lake brine contains various ionic components as described above, magnesium is deposited as magnesium carbonate through the carbonation step and may be mixed in lithium carbonate as a final product, thereby decreasing the purity thereof, and therefore, magnesium is necessarily removed before the carbonation step. The method of removing magnesium currently employed includes a method of adding calcium hydroxide for removing magnesium in the form of magnesium hydroxide, and a method of adding sodium carbonate for removing magnesium in the form of magnesium carbonate (see, for example, Patent Document 1).

In the carbonation step, sodium carbonate is added to the brine having a high lithium concentration prepared in the concentrating and chemical-adding steps, thereby depositing lithium carbonate (see, for example, Non-patent Document 2). In this step, a large amount of sodium carbonate is consumed, and it is said that the cost of sodium carbonate occupies the major proportion of the production cost of lithium carbonate. In the lithium production from the salt lake brine of Atacama Salt Lake, Chile, the brine is concentrated by solar evaporation to a brine having a high lithium concentration within the salt lake, and the concentrated brine is then transported with tank trucks to the plants in the coastal area, at which the concentrated brine is subjected to the carbonation step by using inexpensive sodium carbonate available as natural soda ash.

In the production of lithium carbonate from brines, as described above, lithium carbonate is produced through the solar evaporation and concentrating, the removal of impurities by adding chemicals, and the carbonation with sodium carbonate, but it is the current situation that the production process is limited only to a few examples represented by Atacama Salt Lake, Chile, and for addressing the growing demand of lithium in the future, it is necessary to develop much salt lake brine resources.

In the production of lithium carbonate described above, however, a brine that has a large content of interfering components, particularly magnesium and sulfate ion, cannot be applied to the production method that is currently employed in Atacama Salt Lake, Chile.

Specifically, brains in Uyuni Salt Lake, Bolivia, Qinghai Salt Lake, China, and the like have a high magnesium content, and the Mg/Li concentration ratio is from 19 to 62 (the Mg/Li concentration ratio is 6 in Atacama Salt Lake, Chile, and is 1 in Hombre Muerto Salt Lake, Argentina). Accordingly, not only chemicals, i.e., calcium hydroxide and sodium carbonate, are required in large amounts for removing magnesium, but also a large amount of sludges of magnesium hydroxide and magnesium carbonate are formed, and the concentrated brine is trapped with the sludges, which prevents recovery of the concentrated brine containing lithium.

Furthermore, there are often salt lake brines having a high sulfate ion concentration, and for example, the $SO_4/Li$ concentration ratio is 24 in Uyuni Salt Lake, Bolivia, and 138 in Qinghai Salt Lake, China (the $SO_4/Li$ concentration ratio is 11 in Atacama Salt Lake, Chile), in which it is the current situation that the lithium concentration can be increased only to 6 g/L in the evaporation cocentrating step, and thus a concentrated brine suitable for the carbonation step, which is generally applied to a high concentration region of approximately 60 g/L or more, cannot be obtained.

Moreover, sodium carbonate, which is necessary in the carbonation step, is available as relatively inexpensive natural soda ash by large scale transshipment in the coastal area, but most of salt lakes are located in inland highlands, at which sodium carbonate is difficultly available in many cases.

Under the circumstances, for addressing the growing demand of lithium resources in the future, there are demands of an efficient lithium recovery technique from brines containing large amounts of interfering components, such as magnesium and sulfate ion, and a technique relating to a carbonation step that uses no sodium carbonate.

The present inventors have worked around the demands, and propose a method for producing lithium carbonate without the use of sodium carbonate, in which ammonia and carbon dioxide gas are mixed with an aqueous solution containing lithium chloride to perform carbonation reaction, and the solid matter thus formed is recovered through solid-liquid separation (Japanese Patent Application No. 2010-266077).
Patent Document 1: U.S. Pat. No. 5,993,759
Non-Patent Document 1: GSJ Chishitsu News No. 670, pages 22 to 26, "Lithium Resources"
Non-Patent Document 2: GSJ Chishitsu News No. 670, pages 49 to 52, "Production of Lithium from Salar de Atacama, Chile, and Use of Lithium Compounds"

SUMMARY OF THE INVENTION

Furthermore, the present inventors have made earnest investigations on optimization of the reaction conditions in the production of lithium carbonate by utilizing ammonia and carbon dioxide gas as described above, and on the steps of evaporation concentration, desulfurization, and electrodialysis as the pretreatments for a concentrated brine as a raw material, for developing a more efficient production process of lithium carbonate from brine resources, from which lithium is difficultly recovered due to interfering components, such as magnesium and sulfate ion. As a result, the invention has been completed.

An object of the invention is to provide a method for producing lithium carbonate that is capable of being applied to production of lithium carbonate from brine resources containing a large amount of interfering components, such as magnesium and sulfate ion, from which lithium is difficultly recovered by an ordinary technique, and is capable of being practiced in highlands and inlands, in which inexpensive sodium carbonate, such as natural soda ash, is difficultly available.

The invention provides a method for producing lithium carbonate that achieves the above and other objects, and in summary, a carbonation step is performed, i.e., carbon dioxide gas obtained by calcining limestone is introduced, in the presence of ammonia, into a concentrated brine, which is prepared from a lithium-containing brine as a raw material through an evaporative concentrating step, a desulfurizing step and an electrodialysis step, thereby depositing lithium carbonate crystals, and the crystals thus deposited are recovered through solid-liquid separation.

Specifically, a method for producing lithium carbonate according to the present invention, comprises:
a desulfurizing step of adding a desulfurizing agent containing a calcium compound to a lithium-containing brine as a raw material, and removing sulfate ion contained in the brine as gypsum, thereby obtaining a desulfurized brine;
evaporatively concentrating the desulfurized brine, and removing crystallized matters therefrom through solid-liquid separation, thereby obtaining a primarily concentrated brine;
subjecting the primarily concentrated brine to electrodialysis by a monovalent ion-permselective ion exchange membrane, thereby obtaining a secondarily concentrated brine;
evaporatively concentrating again the secondarily concentrated brine, and removing crystallized matters therefrom through solid-liquid separation, thereby obtaining a tertiary concentrated brine;
a carbonation step of introducing carbon dioxide gas obtained by calcining limestone to the tertiary concentrated brine in the presence of ammonia, thereby depositing lithium carbonate crystals; and
recovering the lithium carbonate crystals through solid-liquid separation.

In the electrodialysis step, impurity components other than monovalent ions contained in the brine are preferably removed by using a monovalent ion-permselective ion exchange membrane.

Additionally, in the carbonation step, it is preferable that the tertiary concentrated brine, to which carbon dioxide gas is to be introduced, has a lithium concentration of from 20 to 55 g/L, an amount of the coexisting ammonia is from 0.8 to 2.0 in terms of the $NH_3/Li$ molar ratio, and an amount of the carbon dioxide gas that is introduced is from 0.3 to 1.5 in terms of the $CO_2/Li$ molar ratio.

Furthermore, it is preferable that the ammonia that is used in the carbonation step is recovered ammonia obtained in such a manner that calcium oxide produced upon calcining limestone for obtaining carbon dioxide gas, or calcium hydroxide obtained from the calcium oxide through lime slaking is added to a separated liquid obtained through solid-liquid separation after the carbonation step, and ammonia gas formed through reaction of ammonium chloride contained in the separated liquid with the calcium oxide or calcium hydroxide is recovered and cyclically used.

Upon the recovery of ammonia, an amount of the calcium oxide or calcium hydroxide to be added is from 0.3 to 1.0 in terms of the $Ca/NH_3$ molar ratio.

Also, it is preferable that a residual liquid containing calcium chloride, obtained after the recovery of ammonia gas is used as the desulfurizing agent containing a calcium compound, which is added in the desulfurizing step.

Additionally, it is preferable that the lithium carbonate crystals recovered through solid-liquid separation after the carbonation step are washed by flow-through washing.

In the invention, concentration of lithium and removal of impurities can be performed efficiently for a brine containing interfering components, such as magnesium and sulfate ion, through a desulfurizing step, an evaporative concentrating step and an electrodialysis step, thereby obtaining a concentrated brine that is suitable for the carbonation step in the later stage, and therefore, lithium can be recovered from many brine resources, from which lithium cannot be recovered due to the presence of interfering components.

Furthermore, in the carbonation step, lithium carbonate is deposited without the use of sodium carbonate in the presence of ammonina by using carbon dioxide gas obtained by calcining limestone, and therefore, lithium carbonate can be produced even in regions where natural soda ash is difficultly available, for example, highlands and inlands. Moreover, ammonia used in the carbonation step can be cyclically used, and the residual solution after recovering ammonia can be reused as a desulfurizing agent containing a calcium compound added in the desulfurizing step, thereby realizing environment-conscious production of lithium carbonate suppressing formation of waste materials.

DETAILED DESCRIPTION OF THE INVENTION

Figure 1:
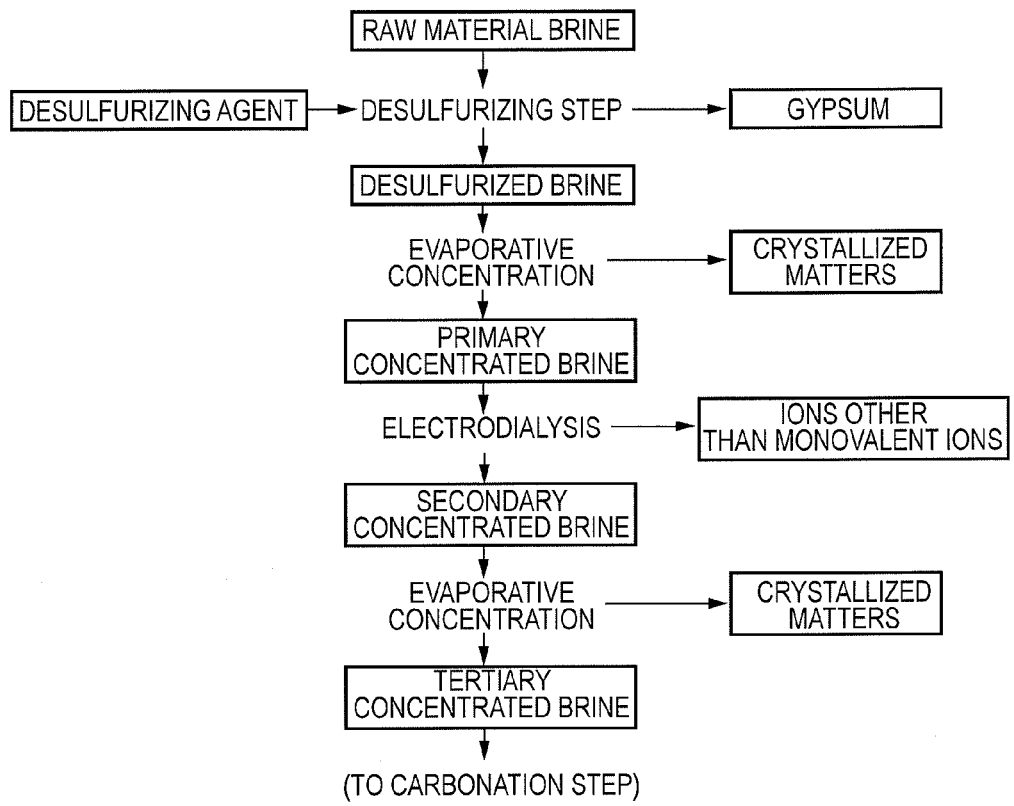
FIG. 1 is a flow chart showing concentration of a concentrated brine.
Figure 2:
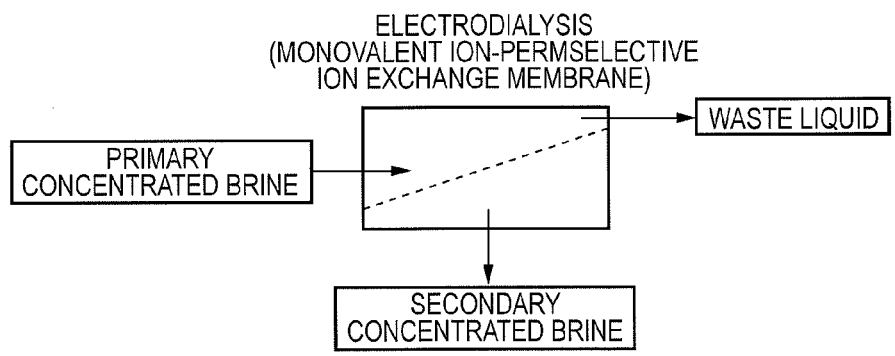
FIG. 2 is a flow chart showing an electrodialysis step.
Figure 3:
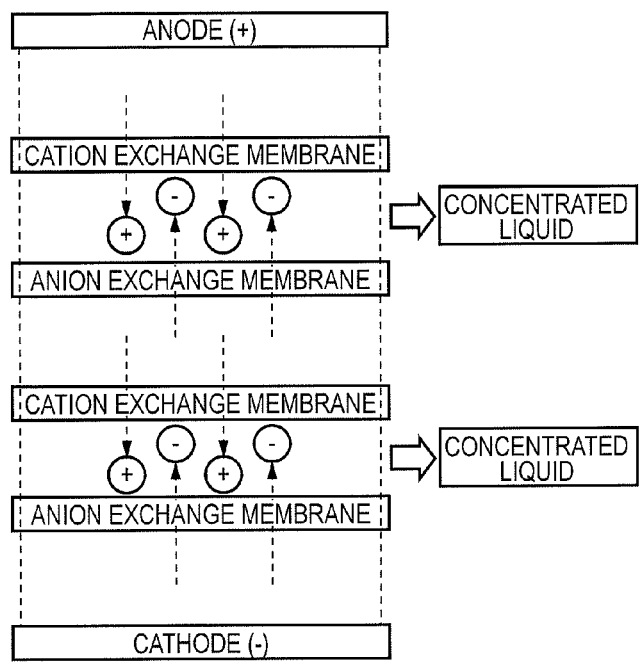
FIG. 3 is a conceptual illustration showing electrodialysis.
Figure 4:
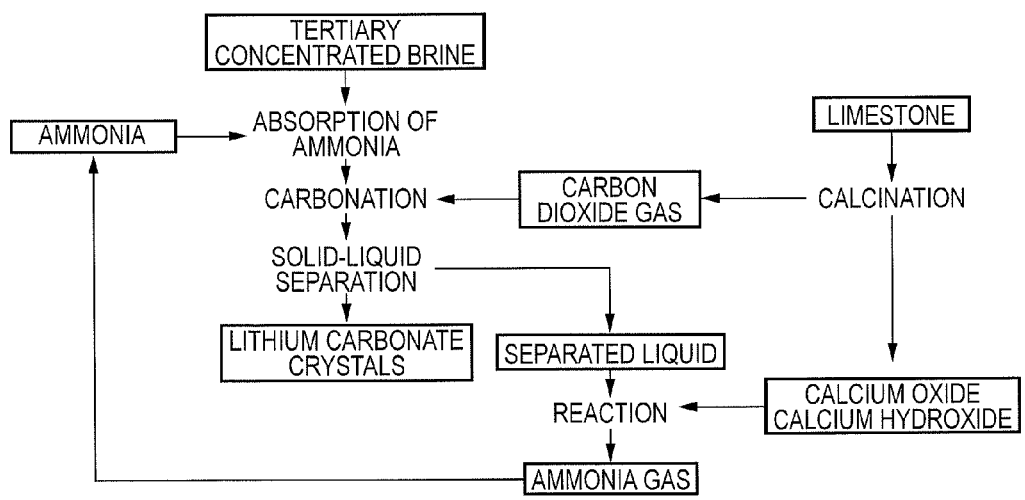
FIG. 4 is a flow chart showing cyclic use of ammonia in a carbonation step.
Figure 5:
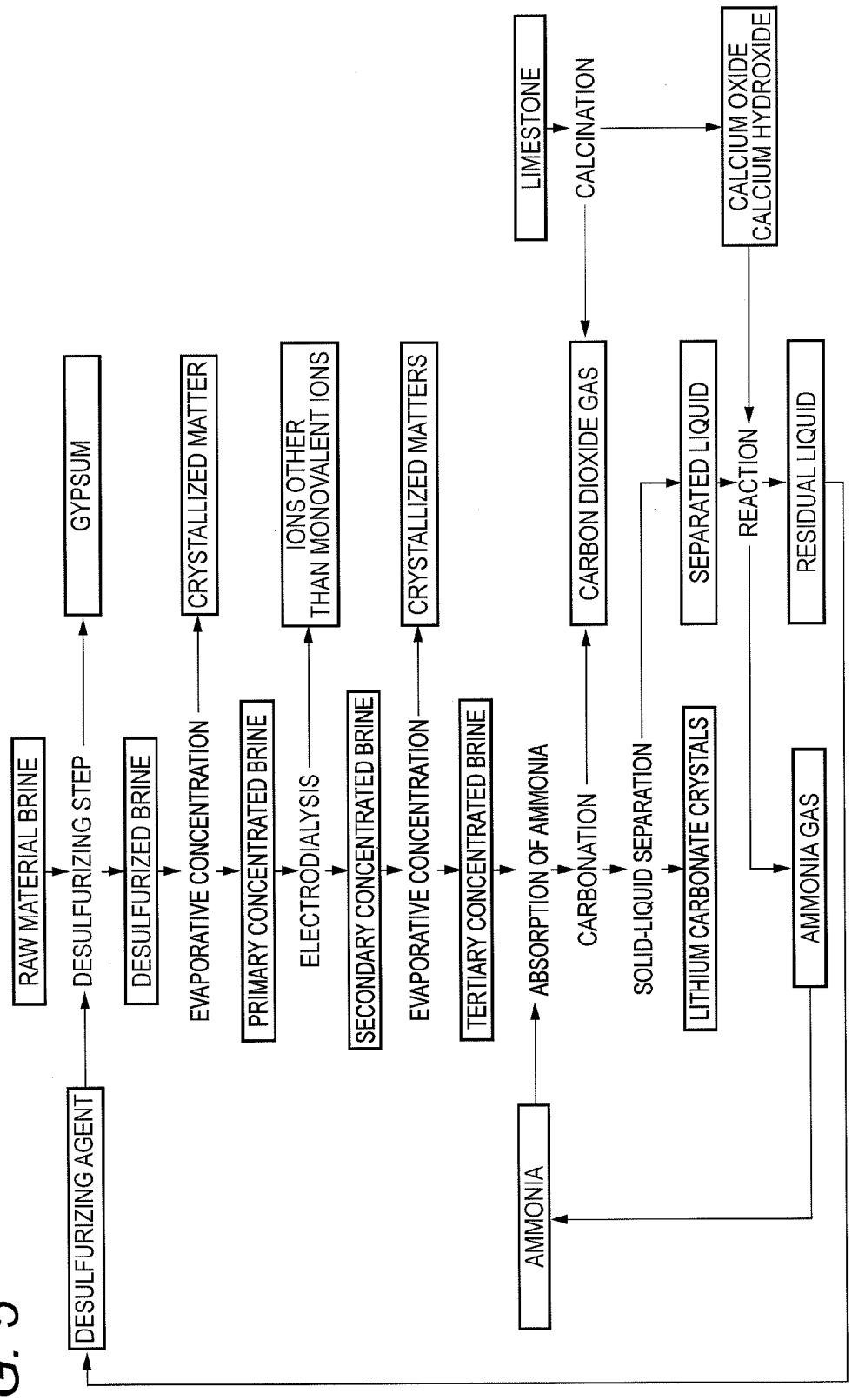
FIG. 5 is a flow chart showing use of a residual liquid after recovering ammonia in a desulfurizing step.

The method for producing lithium carbonate according to the invention will be described in detail below.

In the method for producing lithium carbonate of the invention, in summary, a carbonation step is performed, i.e., carbon dioxide gas obtained by calcining limestone is introduced, in the presence of ammonia, into a concentrated brine, which is prepared from a lithium-containing brine as a raw material through an evaporative concentrating step, a desulfurizing step and an electrodialysis step, thereby depositing lithium carbonate crystals, and the crystals thus deposited are recovered through solid-liquid separation.

The lithium-containing brine used as a raw material may be any brine that contains lithium to be recovered, for example, a salt lake brine, a geothermal brine and a salt-manufacturing brine, and in particular, a salt lake brine has a high lithium concentration as compared to other types of brines in many cases and is suitable as a raw material in the invention. In the invention, lithium carbonate can be efficiently produced from a brine containing magnesium and sulfuric acid, which act as interfering components upon producing lithium carbonate by an ordinary method, in high concentrations, and a lithium-containing brine, from which lithium is difficultly recovered, having an Mg/Li ratio and an $SO_4$/Li ratio exceeding 10 can be used as a raw material in the invention.

The lithium-containing brine used as a raw material may be used as it is after pumping up, or may be used after subjecting to preliminary concentration. In the case where the preliminary concentration is performed, it is preferably performed until a lithium concentration of from 5 to 6 g/L, which is short of the start of deposition of lithium sulfate in the brine.

By performing the concentrating operation as a preliminary step, the amount of liquid to be processed in the desulfurizing step and the electrodialysis step subsequent thereto can be reduced, which suppresses the equipment cost and the operation cost.

In the case where the preliminary concentration is performed, sodium, potassium, magnesium and the like contained in the brine are crystallized in the form of sodium chloride (NaCl), potassium chloride (KCl), magnesium chloride ($MgCl_2.6H_2O$), potassium magnesium chloride ($KMgCl_3.6H_2O$), potassium magnesium chloride sulfate ($KMg(SO_4)Cl.3H_2O$) and the like, and can be removed through solid-liquid separation, thereby achieving not only increase of the lithium concentration but also decrease of the relative concentration of impurities.

For example, when a raw material brine having a lithium concentration of 1 g/L, a potassium concentration of 25 g/L and a magnesium concentration of 20 g/L is concentrated as preliminary concentration to a lithium concentration of 6 g/L, potassium chloride and potassium magnesium chloride are deposited and removed in the course of concentration to provide a potassium concentration of approximately 10 g/L and a magnesium concentration of approximately 80 g/L, and thus the relative concentrations thereof with respect to lithium are decreased. The measures for the evaporative concentration are not particularly limited, and a chemical equipment, such as an evaporator, may be used, but solar evaporative concentration in evaporation ponds may be reasonably employed.

In the invention, the brine, i.e., the pumped up brine or the brine obtained by preliminarily concentrating the pumped up brine, is subjected to a carbonation step for depositing lithium carbonate, and before the carbonation step, the brine is converted to a concentrated brine through removal of impurities and enrichment of lithium as pretreatments. The pretreatments performed may include a desulfurizing step for preventing deposition loss of lithium sulfate, an evaporative concentrating step for increasing the lithium concentration, and an electrodialysis step by using a monovalent ion-permselective ion exchange membrane for removing impurity components other than monovalent ions.

In these steps, the following treatments may be performed, which are schematically shown in the flow chart in FIG. 1 for concentration.

(1) A desulfurizing agent containing a calcium compound is added to a raw material brine, whereby sulfate ion contained in the brine is removed as gypsum, thereby obtaining a desulfurized brine, (2) the desulfurized brine is evaporatively concentrated, and crystallized matters are removed therefrom through solid-liquid separation, thereby obtaining a primarily concentrated brine, (3) the primarily concentrated brine is subjected to electrodialysis by using a monovalent ion-permselective ion exchange membrane, thereby obtaining a secondarily concentrated brine, and (4) the secondarily concentrated brine is again evaporatively concentrated, and crystallized matters are removed therefrom through solid-liquid separation, thereby obtaining a tertiary concentrated brine.

The aforementioned steps will be described in detail respectively below.

In the desulfurizing step (1), sulfate ion, which acts as an interfering factor on concentrating lithium, is removed.

Upon removing sulfate ion, a desulfurizing agent containing a calcium compound is added for depositing gypsum (calcium sulfate, $CaSO_4.2H_2O$), which is then removed through solid-liquid separation. Sulfate ion is preferably removed to such an extent that lithium sulfate, which is formed by combining lithium ion and sulfate ion remaining in the brine, is not deposited, and the resulting sulfate ion concentration is preferably 25 g/L or less, and more preferably 15 g/L or less. When sulfate ion remains in an amount exceeding the above range, lithium sulfate may be deposited in the secondary concentration in the later stage, and lithium may be lost in some cases. The desulfurizing agent containing a calcium compound will be described later.

In the primary concentration (2), the desulfurized brine having been desulfurized in the step (1) is evaporatively concentrated. A brine, from which sulfate ion has been removed, can be concentrated to a lithium concentration exceeding 6 g/L, and thus the amount of liquid to be processed in the subsequent electrodialysis step can be reduced, thereby suppressing the equipment cost and the operation cost. Furthermore, the impurity components, such as sodium chloride, potassium chloride and potassium magnesium chloride, are crystallized and removed upon evaporation, thereby achieving not only increase of the lithium concentration but also decrease of the relative concentration of impurities.

The primary concentration is preferably performed to increase the lithium concentration to from 8 to 25 g/L. When the lithium concentration is lower than the range, the load in the subsequent electrodialysis step may be increased, which is disadvantageous in the equipment cost and the operation cost. When the lithium concentration exceeds the range, on the other hand, the period of time required for concentrating may be prolonged, which may adversely affect the production efficiency in the total process in some cases. The measures for the evaporative concentration are not particularly limited, and a chemical equipment, such as an evaporator, may be used, but solar evaporative concentration in evaporation ponds may be reasonably employed.

In the electrodialysis step (3), the impurity components other than monovalent ions contained in the brine are removed by using a monovalent ion-permselective ion exchange membrane.

In the electrodialysis, the ionic components dissolved are electrically migrated, in which cation exchange membranes and anion exchange membranes are made to intervene alternately, whereby cations passing through the cation exchange membrane and anions passing through the anion exchange membranes are concentrated in the concentrated solution.

By using a monovalent ion-permselective ion exchange membrane in the electrodialysis, monovalent ions and polyvalent ions among the cations and anions can be separated from each other. In the monovalent ion-permselective cation exchange membrane, a weakly positively charged layer is formed as a surface layer of a cation exchange membrane having introduced therein a sulfone group, a carboxylic acid group and the like having a negative charge, thereby repulsing polyvalent cation having a large charge, and thus monovalent cations can be selectively permeated.

In the monovalent ion-permselective anion exchange membrane, a weakly negatively charged layer is formed as a surface layer of an anion exchange membrane having introduced therein a quaternary ammonium salt group and the like having a positive charge, thereby repulsing polyvalent anion having a large charge, and thus monovalent anions can be selectively permeated.

Accordingly, in the case of the electrodialysis using a monovalent ion-permselective ion exchange membrane, monovalent cations, such as lithium, sodium and potassium, and chloride ions as monovalent anions are selectively recovered in a concentrated solution. On the other hand, divalent ions, such as magnesium ion and sulfate ion, are prevented from migrating to the concentrated solution.

By utilizing the phenomenon, lithium as a target component to be recovered and magnesium as an interfering component in the carbonation step can be efficiently separated from each other. The operation conditions of the electrodialysis are preferably controlled suitably for the membrane area, the flow rate, the electric current density and the like, according to an ordinary method, depending on the solution composition, the throughput, the design transport numbers of the ion components, and the like.

In the secondary concentration (4), finally, the secondarily concentrated brine having been subjected to the removal of impurities and the concentration of lithium by electrodialysis is again evaporatively concentrated, and crystallized matters are removed therefrom through solid-liquid separation, thereby obtaining a tertiary concentrated brine having a lithium concentration suitably controlled for the subsequent carbonation step. The lithium concentration in the carbonation step will be described later.

The measures for the evaporative concentration are not particularly limited, and a chemical equipment, such as an evaporator, may be used, but solar evaporative concentration in evaporation ponds may be reasonably employed.

In the carbonation step, carbon dioxide gas obtained by calcining limestone is introduced, in the presence of ammonia, into the tertiary concentrated brine thus prepared through the pretreatments described above, thereby depositing lithium carbonate. The carbonation reaction in this step proceeds according to the following reaction formula (1).

$$2LiCl + 2NH_4OH + CO_2 \rightarrow Li_2CO_3\downarrow + 2NH_4Cl + H_2O \quad (1)$$

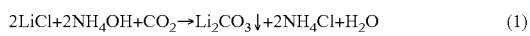

In the carbonation step, the lithium concentration of the tertiary concentrated brine, to which carbon dioxide gas is to be introduced, is preferably from 20 to 55 g/L. When the lithium concentration is lower than the range, the deposition rate of lithium carbonate caused by introducing carbon dioxide gas may be decreased to deteriorate the efficiency. On the other hand, the lithium concentration that exceeds 55 g/L may increase the chlorine ion concentration in the concentrated brine, which may inhibit the carbonation reaction by deposition of ammonium chloride crystals upon introducing ammonia, and may also deteriorate the purity of resulting lithium carbonate in some cases.

Accordingly, in the reconcentration of the secondary concentrated brine obtained after the electrodialysis, the lithium concentration after the reconcentration is preferably from 20 to 55 g/L.

The amount of ammonia that is present in the carbonation step is preferably from 0.8 to 2.0 in terms of the $NH_3/Li$ molar ratio. When the amount of ammonia is too small, the deposition rate of lithium carbonate may be lowered, thereby deteriorating the efficiency. When the $NH_3/Li$ molar ratio exceeds 2.0, on the other hand, not only the use of an excessive amount of ammonia may increase the cost of the raw material, but also the amount of calcium oxide or calcium hydroxide that is necessary for recovering ammonia in the later stage may also be increased, and the raw material cost over the process may be increased, which is economically disadvantageous.

Upon adding ammonia, an absorption tower, such as a bubble cap tower, a packed tower, a trayed tower or the like, is used, and ammonia is made to be absorbed into the concentrated brine with the absorption tower. The concentrated brine is fed from the tower top, whereas ammonia gas is fed from the tower bottom, and the concentrated brine flowing down absorbs ammonia. The absorption of ammonia generates heat, and a cooling operation is preferably performed. The measures for cooling include such a method that the liquor in the tower is withdrawn from the intermediate position of the tower and cooled by a heat exchanger, and the cooled liquor is then returned to the tower.

According to the absorption of ammonia, the concentrated brine is in an alkaline range, and in the case where magnesium remains in the concentrated brine, magnesium hydroxide may precipitate in some cases.

In this case, the precipitation of magnesium hydroxide may cause deterioration of the purity of lithium carbonate, and therefore, it is preferred that the concentrated brine is withdrawn from the absorption tower, from which the magnesium hydroxide precipitate is the separated through solid-liquid separation by filtration or the like, and then the concentrated brine after the separation is returned to the absorption tower.

Upon introducing carbon dioxide gas in the subsequent carbonation step, carbon dioxide gas obtained by calcining limestone is introduced to the concentrated brine having absorbed the prescribed amount of ammonia. The amount of carbon dioxide gas introduced is preferably from 0.3 to 1.5 in terms of the $CO_2/Li$ molar ratio. When the ratio is lower than the range, the deposition rate of lithium carbonate may be lowered, and lithium may remain unreacted in the reaction solution, which may deteriorate the efficiency. When the ratio exceeds the range, on the other hand, the use of an excessive amount of carbon dioxide gas increases the necessary amount of limestone, which may cause increase of the raw material cost.

The calcination reaction of limestone for providing carbon dioxide gas proceeds according to the following reaction formula (2).

$$CaCO_3 \rightarrow CaO+CO_2\uparrow \qquad (2)$$

The lime kiln used for calcination may be selected from various calcination kilns without particular limitation, and examples thereof include a Maerz kiln, a Beckenbach kiln, a vertical kiln, a Chisaki-type kiln and a rotary kiln.

The temperature upon calcination varies depending on the type of the kiln, the type of the fuel, and the other various operation conditions, and for performing the reaction of the reaction formula (2) efficiently, the temperature may be from 800 to 1,500° C. The concentration of the carbon dioxide gas thus generated is preferably higher, and when the concentration is too low, a concentrating process may be provided separately. The carbon dioxide gas thus generated may be fed to a washing tower for removing dusts contained therein, compressed with a carbon dioxide gas compressor, and then fed to the carbonation step.

Carbon dioxide gas may be introduced by using a bubble cap tower, a packed tower, a trayed tower or the like, as similar to the absorption of ammonia. The absorption of ammonia and the introduction of carbon dioxide can be performed in one tower, and in this case, the concentrated brine is fed from the tower top, ammonia is fed from the middle of the tower, and carbon dioxide is fed from the tower bottom, thereby making an ammonia absorption zone in the upper part of the tower, and a carbon dioxide gas introduction zone in the lower part of the same tower.

After completing the carbonation step, the lithium carbonate crystals thus deposited and the separated liquid are recovered with a solid-liquid separation device, such as a centrifugal dehydrator, a centrifugal separator, a pressure filtering device, a depressurizing filtering device and a filter press.

Ammonia that is used in the carbonation step is preferably recovered ammonia obtained in the following manner. Calcium oxide produced upon calcining limestone for obtaining carbon dioxide gas, or calcium hydroxide obtained from the calcium oxide through lime slaking is added to the separated liquid obtained through solid-liquid separation after the carbonation step, and ammonia formed through reaction of ammonium chloride contained in the separated liquid with the calcium oxide or calcium hydroxide is recovered and cyclically used.

The ammonia recovering reaction proceeds according to the following reaction formula (3).

$$2NH_4Cl+Ca(OH)_2 \rightarrow CaCl_2+2H_2O+2NH_3\uparrow \qquad (3)$$

The separated liquid obtained through solid-liquid separation after the carbonation step contains mainly ammonium chloride and also contains ammonium carbonate, ammonium hydrogen carbonate and the like, which are dissolved therein. The carbonate salt and the hydrogen carbonate salt are decomposed only by heating to form ammonia gas, but ammonium chloride remains and thus is decomposed by adding calcium oxide or calcium hydroxide, thereby forming calcium chloride and ammonia according to the reaction formula (3).

It is preferred that ammonia thus produced is recovered with a distillation tower as ammonia gas, which is cyclically used in the ammonia absorption step for the concentrated brine in the preceding step. The cyclic use of ammonia suppresses further consumption of the makeup ammonia, and also prevents ammonium chloride from being discharged as a waste material, thereby realizing an environment-conscious process.

Ammonia may be lost in a slight amount in the steps of absorption of ammonia, carbonation, solid-liquid separation, and recovery of ammonia, and in this case, a necessary amount of ammonia is preferably supplied in the step of absorption of ammonia.

The amount of calcium oxide or calcium hydroxide added in the step of recovery of ammonia is preferably from 0.3 to 1.0 in terms of the $Ca/NH_3$ molar ratio. When the molar ratio is less than 0.3, the recovery rate of ammonia is lowered, which deteriorates the efficiency of the cyclic use of ammonia. The molar ratio is preferably in the aforementioned range, and when the molar ratio exceeds 1.0, the recovery rate of ammonia is substantially not changed, but the consumption of calcium oxide or calcium hydroxide is simply increased to raise the raw material cost.

In the case where calcium oxide is added, quicklime (calcium oxide) obtained in the lime kiln for obtaining carbon dioxide gas for the carbonation step may be used as it is or after appropriately adjusted for particle size. In alternative, calcium oxide may be converted to calcium hydroxide by adding water and then added thereto.

Calcium oxide or calcium hydroxide may be added in the form of solid or suspension to the separated liquid after the carbonation reaction with such a device that calcium oxide or calcium hydroxide is added and agitated, or may be added directly to the ammonia distillation tower.

In the ammonia recovering step described above, ammonia contained in the separated liquid after the carbonation step is recovered, and a residual liquid containing calcium chloride as a by-product of the ammonia recovering reaction, lithium chloride unreacted in the carbonation step, and the like is formed.

The residual liquid obtained after the recovery of ammonia is preferably recycled as the desulfurizing agent containing a calcium compound added in the desulfurizing step, which is performed as a pretreatment of the raw material brine.

The residual liquid contains calcium chloride dissolved therein as a by-product of the ammonia recovering reaction, as described above, and calcium chloride forms gypsum through reaction with sulfate ion in the brine. Therefore, the residual liquid containing calcium chloride thus exhausted may be utilized as a desulfurizing agent. The residual liquid, which has been discarded as a waste product, is reused in the desulfurizing step, whereby not only sulfate ion, which acts as an interfering component upon concentrating lithium of the raw material brine, can be removed, but also the amount of the waste products can be effectively decreased.

The desulfurizing reaction proceeds according to the following reaction formula (4).

$$CaCl_2+Li_2SO_4+2H_2O \rightarrow 2LiCl+CaSO_4 \cdot 2H_2O\downarrow \qquad (4)$$

As the desulfurizing agent containing a calcium compound added in the desulfurizing step, calcium oxide, calcium hydroxide, calcium chloride and the like in the form of a solid, an aqueous solution, an suspension or the like may be used in addition to the residual liquid after the recovery of ammonia, and in the case where the raw material brine has a high sulfate ion concentration, and the target sulfate ion concentration cannot be obtained only with the residual liquid after the recovery of ammonia, calcium oxide, calcium hydroxide, calcium chloride and the like may be added.

As calcium oxide or calcium hydroxide, in particular, quicklime (calcium oxide) obtained in the lime kiln for providing carbon dioxide gas for the carbonation step or slaked lime (calcium hydroxide) obtained by adding water thereto may be used.

The residual liquid after the recovery of ammonia also contains a lithium component that has been unreacted in the carbonation step. Disposal of the lithium component is inefficient, and the cyclic use of the residual liquid as a desulfurizing agent for the desulfurizing step, as in the invention, enables very efficient production of lithium carbonate.

The lithium carbonate crystals thus recovered through solid-liquid separation after the carbonation step are generally preferably washed by flow-through washing. Only with simple dehydration and separation, unreacted sodium, calcium and magnesium, by-produced ammonium chloride and ammonium carbonate, and the like contained in the reaction solution attached to the crystals may be crystallized upon drying and thus may deteriorate the purity of lithium carbonate as a final product.

Accordingly, it is preferred to wash the crystals with a suitable amount of water, a saturated lithium carbonate aqueous solution or the like by flow-through washing.

The lithium carbonate crystals obtained through solid-liquid separation and washing are finally dried to provide a final product. The drying operation may be performed by using various kinds of dryers without particular limitation, such as a shelf type dryer, a spray dryer, an flash dryer and a rotary tube dryer. The drying temperature in the drying operation is preferably from 60 to 250° C.

Lithium carbonate that is obtained through the steps described above is produced efficiently from brine resources containing interfering components in lithium carbonate production, such as magnesium and sulfate ion, without the use of sodium carbonate, and has a grade of 99.5%, which can be used as a raw material for a lithium ion battery.

Furthermore, the production method of the invention is effective as an environment-conscious process that effectively utilizes the raw materials and reduces the waste products, through the cyclic use of ammonia in the carbonation step, the effective use of carbon dioxide gas and calcium oxide obtained by calcining limestone in the carbonation step and the ammonia recovering step, respectively, and the recycling use of the residual liquid after recovering ammonia as a desulfurizing agent.

EXAMPLE

The invention will be described in more detail with reference to examples below, but the invention is not limited to the examples.

Raw Material Brine

A salt lake brine produced in South America was preliminarily concentrated to provide a raw material brine, which was used for producing lithium carbonate.

The raw material brine had the composition shown in Table 1 below.

TABLE 1

Composition of Raw Material Brine

| | Li | Na | K | Mg | Ca | Cl | $SO_4$ |
|---|---|---|---|---|---|---|---|
| Raw material brine (before preliminary concentration) | 1.6 | 66 | 20.3 | 32.7 | 0.2 | 199 | 24.2 |
| Raw material brine (after preliminary concentration) | 6.1 | 6.6 | 10.4 | 86.8 | 0.04 | 280 | 41.6 |

(unit: g/L)

Desulfurization

To 17.5 L of the raw material brine after preliminary concentration, 2.3 L of a simulated solution, which simulated the composition of the residual liquid containing calcium chloride after recovering ammonia in the ammonia recovering step, was gradually added under agitation, thereby depositing gypsum, and then the solid contents were removed to prepare a desulfurized brine.

The compositions of the simulated solution and the desulfurized brine are shown in Tables 2 and 3 below.

TABLE 2

Composition of Simulated Solution of Residual Solution after Recovery of Ammonia

| | Li | Na | K | Mg | Ca | Cl | $SO_4$ |
|---|---|---|---|---|---|---|---|
| Simulated solution of residual solution | 10.3 | — | — | — | 129 | 281 | — |

(unit: g/L)

TABLE 3

Composition of Desulfurized Brine

| | Li | Na | K | Mg | Ca | Cl | $SO_4$ |
|---|---|---|---|---|---|---|---|
| Desulfurized brine | 6.7 | 5.8 | 8.9 | 82.1 | 0.8 | 254 | 3.1 |

(unit: g/L)

Primary Concentrating Step

The desulfurized brine was evaporatively concentrated by heating to 40° C., and crystallized matters were removed therefrom through solid-liquid separation, thereby obtaining a primary concentrated brine. The primary concentrated brine had the composition shown in Table 4 below.

TABLE 4

Composition of Primary Concentrated Brine

| | Li | Na | K | Mg | Ca | Cl | $SO_4$ |
|---|---|---|---|---|---|---|---|
| Primary concentrated brine | 19 | 1.4 | 0.8 | 93.4 | 0.3 | 306 | 3.4 |

(unit: g/L)

Electrodialysis Step

The primary concentrated brine was subjected to removal of magnesium and sulfate ion with an electrodialysis apparatus using a monovalent ion-permselective ion exchange membrane (cation exchange membrane: Selemion CSO, produced by AGC Engineering Co., Ltd., anion exchange membrane: Selemion ASV, produced by AGC Engineering Co., Ltd.), thereby obtaining a secondary concentrated brine. The secondary concentrated brine had the composition shown in Table 5 below.

TABLE 5

Composition of Secondary Concentrated Brine

|  | Li | Na | K | Mg | Ca | Cl | $SO_4$ |
|---|---|---|---|---|---|---|---|
| Secondary concentrated brine | 26 | 3.5 | 1.7 | 2.8 | 0.1 | 150 | <0.01 |

(unit: g/L)

Tertiary Concentrating Step

The secondary concentrated brine was again evaporatively concentrated by heating to 40° C., and crystallized matters were removed therefrom through solid-liquid separation, thereby obtaining a tertiary concentrated brine for the carbonation step. The tertiary concentrated brine had the composition shown in Table 6 below.

TABLE 6

Composition of Tertiary Concentrated Brine

|  | Li | Na | K | Mg | Ca | Cl | $SO_4$ |
|---|---|---|---|---|---|---|---|
| Tertiary concentrated brine | 40 | 5.5 | 2.7 | 4.4 | 0.1 | 234 | <0.01 |

(unit: g/L)

Carbonation Step 5 g of ammonia was absorbed by 0.5 L of the tertiary concentrated brine ($NH_3$/Li ratio=1.1), and then carbonation reaction was performed by introducing carbon dioxide gas at a rate of 27 mL/min for 120 minutes ($CO_2$/Li ratio=0.5), thereby depositing lithium carbonate. Lithium carbonate thus deposited was dehydrated by a suction filtering device, washed by feeding 0.5 L of desalted water, and then dried at 105° C., and thus was recovered as lithium carbonate crystals. Chemical analysis of the recovered product revealed that the purity of lithium carbonate was 99.7%.

Ammonia Recovering Step

To the residual liquid after the carbonation step, a slurry containing 13 g of slaked lime was added (Ca/$NH_3$ ratio=0.55), followed by agitating, and the mixture was distilled for recovering ammonia.

The raw material brine having the composition shown in Table 1 was subjected to desulfurization by using the residual liquid, from which ammonia had been recovered. As a result, the desulfurization capability that was equivalent to the aforementioned desulfurizing step was obtained, and thus it was confirmed that the residual liquid after the recovery of ammonia was usable as a desulfurizing agent.

While the invention has been described in detail with reference to specific embodiments thereof, it will be apparent to one skilled in the art that various changes and modifications can be made therein without departing from the spirit and scope thereof.

Incidentally, the present application is based on Japanese Patent Application No. 2012-064773 filed on Mar. 22, 2012, and the contents are incorporated herein by reference.

All references cited herein are incorporated by reference herein in their entirety.

What is claimed is:

1. A method for producing lithium carbonate, the method comprising:
    a desulfurizing step of adding a desulfurizing agent containing a calcium compound to a lithium-containing brine as a raw material, and removing sulfate ion contained in the brine as gypsum, thereby obtaining a desulfurized brine;
    evaporatively concentrating the desulfurized brine, and removing crystallized matters therefrom through solid-liquid separation, thereby obtaining a primarily concentrated brine;
    subjecting the primarily concentrated brine to electrodialysis by a monovalent ion-permselective ion exchange membrane, thereby obtaining a secondarily concentrated brine;
    evaporatively concentrating again the secondarily concentrated brine, and removing crystallized matters therefrom through solid-liquid separation, thereby obtaining a tertiary concentrated brine;
    a carbonation step of introducing carbon dioxide gas obtained by calcining limestone to the tertiary concentrated brine in the presence of ammonia, thereby depositing lithium carbonate crystals; and
    recovering the lithium carbonate crystals through solid-liquid separation.

2. The method for producing lithium carbonate according to claim 1, wherein the tertiary concentrated brine, to which carbon dioxide gas is to be introduced in the carbonation step, has a lithium concentration of from 20 to 55 g/L.

3. The method for producing lithium carbonate according to claim 1, wherein an amount of the ammonia that is present in the carbonation step is from 0.8 to 2.0 in terms of the $NH_3$/Li molar ratio.

4. The method for producing lithium carbonate according to claim 1, wherein an amount of the carbon dioxide gas that is introduced in the carbonation step is from 0.3 to 1.5 in terms of the $CO_2$/Li molar ratio.

5. The method for producing lithium carbonate according to claim 1, wherein the ammonia that is used in the carbonation step is recovered ammonia obtained in such a manner that calcium oxide produced upon calcining limestone for obtaining carbon dioxide gas, or calcium hydroxide obtained from the calcium oxide through lime slaking is added to a separated liquid obtained through solid-liquid separation after the carbonation step, and ammonia gas formed through reaction of ammonium chloride contained in the separated liquid with the calcium oxide or calcium hydroxide is recovered and cyclically used.

6. The method for producing lithium carbonate according to claim 5, wherein an amount of the calcium oxide or calcium hydroxide to be added upon the recovery of ammonia is from 0.3 to 1.0 in terms of the Ca/$NH_3$ molar ratio.

7. The method for producing lithium carbonate according to claim 5, wherein a residual liquid containing calcium chloride, obtained after the recovery of ammonia gas is used as the desulfurizing agent containing a calcium compound, which is added in the desulfurizing step.

8. The method for producing lithium carbonate according to claim 1, wherein the lithium carbonate crystals recovered through solid-liquid separation after the carbonation step are washed by flow-through washing.

* * * * *